(12) United States Patent
Nakajima

(10) Patent No.: US 7,256,906 B2
(45) Date of Patent: Aug. 14, 2007

(54) IMAGE PROCESSING APPARATUS AND METHOD FOR PROCESSING DATA FOR IMAGE PROCESSING APPARATUS

(75) Inventor: Yasuki Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 10/047,812

(22) Filed: Jan. 14, 2002

(65) Prior Publication Data

US 2002/0093682 A1    Jul. 18, 2002

(30) Foreign Application Priority Data

Jan. 18, 2001    (JP)    ............................. 2001-009698

(51) Int. Cl.
*G06F 3/12* (2006.01)
*G06F 15/00* (2006.01)

(52) U.S. Cl. .................................... 358/1.15; 358/1.13
(58) Field of Classification Search ............... 358/1.16, 358/1.15, 1.17, 1.18, 1.13, 1.1, 1.9, 407, 358/468, 404, 444, 1.2, 1.6, 1.11, 1.14; 399/1, 399/4
See application file for complete search history.

(56) References Cited

U.S. PATENT DOCUMENTS

| 5,072,310 | A | * | 12/1991 | Yamamoto et al. ......... 358/448 |
| 5,129,639 | A | * | 7/1992 | DeHority .................... 270/1.01 |
| 5,930,358 | A | * | 7/1999 | Rao ............................ 713/193 |
| 6,115,137 | A | * | 9/2000 | Ozawa et al. ................ 358/1.6 |
| 6,163,816 | A | * | 12/2000 | Anderson et al. .............. 710/8 |
| 6,850,273 | B1 | | 2/2005 | Yoshida et al. .......... 348/231.3 |
| 6,862,040 | B1 | * | 3/2005 | Sawachi .................. 348/231.3 |
| 2001/0043340 | A1 | * | 11/2001 | Murata ....................... 358/1.9 |
| 2002/0051002 | A1 | | 5/2002 | Kumada et al. ............ 345/600 |

FOREIGN PATENT DOCUMENTS

| JP | 8-032911 | 2/1996 |
| JP | 2000-295562 | 10/2000 |

OTHER PUBLICATIONS

"Canon Camera Story 1997-2000" http://www.canon.com/camera-museum/history/canon_story/1997_2000/1997_2000.html.*

* cited by examiner

*Primary Examiner*—Dov Popovici
(74) *Attorney, Agent, or Firm*—Fitzpatrick, Cella, Harper & Scinto

(57) ABSTRACT

An image processing apparatus includes a read and analysis unit that analyzes print setting items recorded by a printer and stored in a memory card, and a generation unit that generates additional data relating to print settings required upon printing by the printer based on the print setting items analyzed. The image processing apparatus reduces the user's burden of manipulating print setting items for each printer, and avoids an incident in which print setting items that cannot be set by a printer that is to output image data are set.

14 Claims, 10 Drawing Sheets

Fig. 9

901
```
[HDR]
GEN□CRT = "Degital Camera"01.00
GEN□DTM = 1999:06:24:14:31:00
```

902
```
[JOB]
PRT□PID = 001
PRT□TYP = STD
PRT□QTY = 003
PRT□TSD = 001
PRT□STP = 002
IMG□SRC = "ABC001.JPG]
CFG□TRM = 200, 100, 600, 1000
CFG□ROT = 90
CFG□ZOM = 120
IMG□SRC = "ABC002.JPG"
CFG□DSC = DATE
CFG□SHP = 001
IMG□SRC = ABC003.JPG"
CFG□TRM = 200, 100, 600, 1000
CFG□DSC = DATE
IMG□SRC = "ABC004.JPG"
CFG□DSC = DATE
CFG□ROT = 180
```

903
```
[JOB]
PRT□PID = 002
PRT□TYP = IDX
PRT□QTY = 001
PRT□TSD = 001
PRT□STP = 000
IMG□SRC = "XYZ001.JPG"
CFG□DSC = "No.1"
IMG□SRC = "XYZ001.JPG"
CFG□DSC = "No.2"
IMG□SRC = "XYZ002.JPG"
CFG□DSC = "No.3"
IMG□SRC = "XYZ003.JPG"
CFG□DSC = "No.4"
```

Fig. 12

| Directory Data |
|---|
| First Data Processing Program<br>A group of program codes for the steps of Flowchart shown in Fig. 5 |
| Second Data Processing Program<br>A group of program codes for the steps of Flowchart shown in Fig. 8 |
| Third Data Processing Program<br>A group of program codes for the steps of Flowchart shown in Fig. 10 |
| Fourth Data Processing Program<br>A group of program codes for the steps of Flowchart shown in Fig. 11 |
| |

Memory Map of Storage Medium

IMAGE PROCESSING APPARATUS AND METHOD FOR PROCESSING DATA FOR IMAGE PROCESSING APPARATUS

BACKGROUND OF THE INVENTION

1. Field of the Invention

The present invention relates to an image processing apparatus that permits loading and unloading of a recording medium that stores image data and permits a printer to read the image data. The image processing apparatus can be equipped with a printing section and mounted on a digital camera and permits loading and unloading of a recording medium that stores image data photographed. The present invention also relates to a method for processing data for an image processing apparatus.

2. Description of Related Art

In recent years, accompanied by the spread of image processing apparatuses such as digital cameras, the number of images taken by digital cameras which are printed by printing services in digital laboratories and by personal printers at home is rapidly increasing.

In the conventional printing services that process exposed silver on the films, all of the images on the film are developed, and all of the images need to be printed in order to view and confirm the images. In contrast, when a digital camera is used, images that are photographed by the camera can be immediately viewed and confirmed on the camera. As a result, only the desired images can be printed in any number.

Also, in an image processing system used in the above described image processing apparatuses, a so-called digital print order format (DPOF) is known as a format for automatic print data that is stored in a removable media that is treated in a predetermined image recording format. Using the DPOF, print setting items, such as, for example, image source data, data for character input instruction to input data/time, data for the number of prints, data for printing types that instructs index printing and the like, data for characters and titles inserted, data for image rotating instruction, and data for trimming instruction are recorded in a DPOF file. Also, other print setting items that may be recorded include data for two-side printing instructions, data for stapling instructions, and the like.

However, the print setting items that are included in the automatic print data are already prepared on the digital camera side, and there are possibilities that the print setting items already prepared on the digital camera side may include those that cannot be handled by a printer that actually prints out images.

For example, even when two-side printing can be set in the automatic print data, the printer may not have a system to perform two-side printing. In such a case, an image may be printed in a form that is different from the intended form, or an image may not be printed at all, which is very inconvenient.

SUMMARY OF THE INVENTION

The present invention relates to an image processing apparatus and a method for processing data for an image processing apparatus which reduces the user's burden of manipulating print setting items for each printer, and can avoid the situation in which print setting items that cannot be set by a printer that is to output image data are set.

In accordance with one embodiment of the present invention, an image processing apparatus that permits loading and unloading of a removable recording medium that stores image data has an analysis unit that analyzes print setting items recorded by a printer and stored in the recording medium, and a generation unit that generates additional data relating to print setting required upon printing by the printer based on the print setting items analyzed by the analysis unit.

Also, in accordance with one embodiment of the present invention, a storage apparatus that generates automatic playback control data for image data and stores the image data and the automatic playback control data in a storage medium, includes an interface that is connectable to a removable storage medium. It also includes an analysis unit that analyzes data for setting items stored in the storage medium that is connected to the interface, and a display unit that displays setting items for setting the automatic playback control data based on the analysis result of the analysis unit. There is also a setting unit that sets the automatic playback control data for the image data based on the setting items displayed on the display unit, and a recording unit that records the automatic playback control data set by the setting unit together with the image data in the storage medium.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 9 describes automatic print data for an image processing apparatus in accordance with one embodiment of the present invention.

FIG. 12 describes a memory map of a storage medium that stores a variety of data processing programs that are readable by an image processing system to which an image processing apparatus in accordance with one embodiment of the present invention is applicable.

DETAILED DESCRIPTION OF THE PREFERRED EMBODIMENTS

Preferred embodiments of the present invention are described below with reference to the accompanying drawings.

Figure 1A:
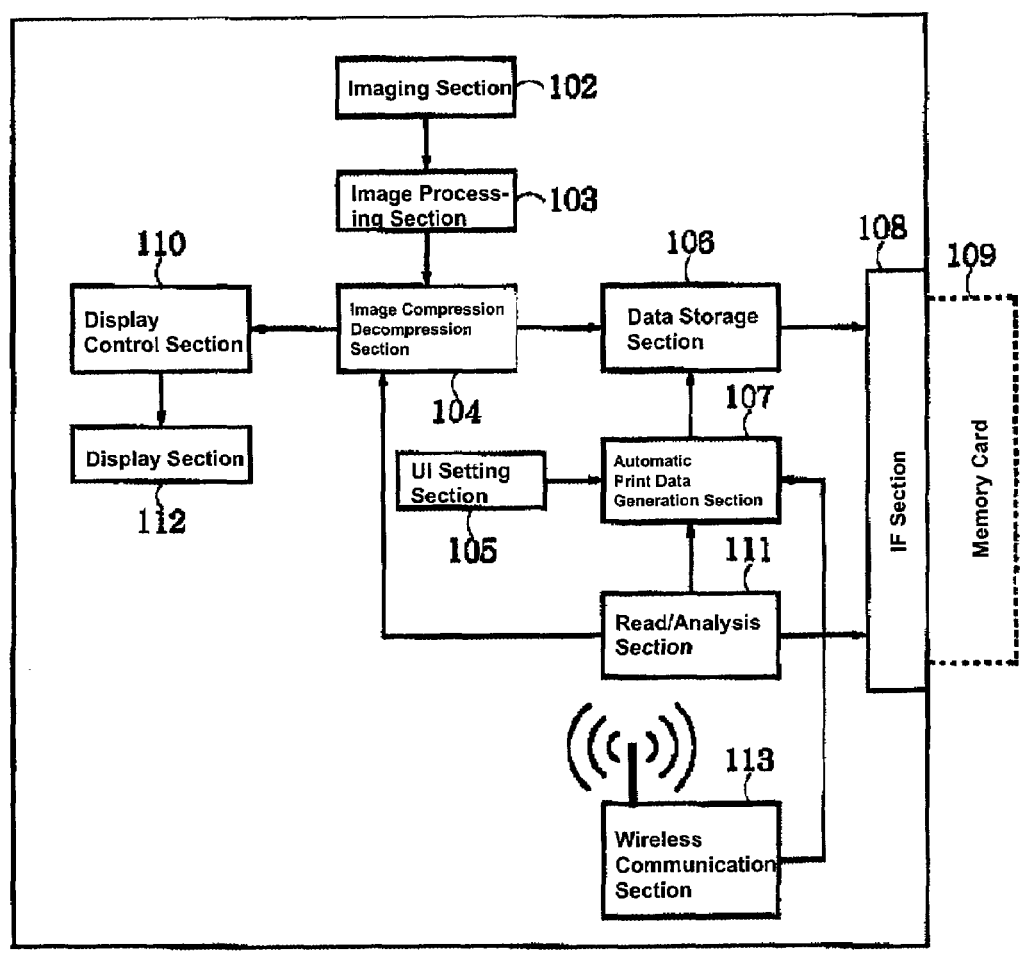
FIGS. 1(*a*), 1(*b*) and 1(*c*) describe an image processing apparatus in accordance with one embodiment of the present invention.
Figure 1B:
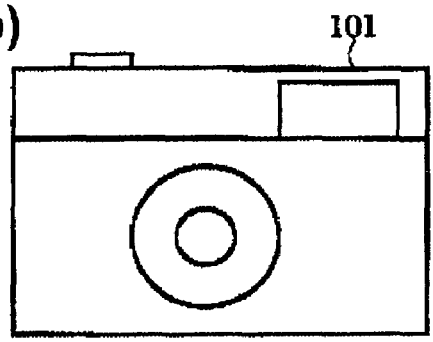
Figure 1C:
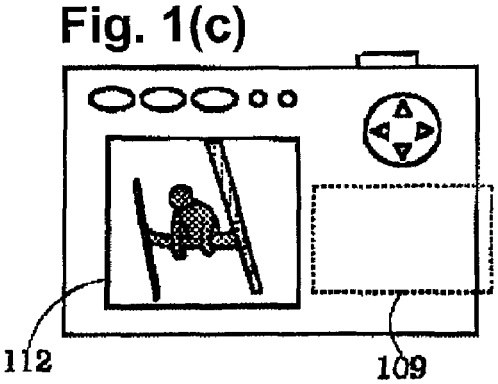

FIGS. 1(a), 1(b) and 1(c) show an image processing apparatus in accordance with one embodiment of the present invention. More particularly, FIG. 1(a) shows a control block diagram of the image processing apparatus, and FIG. 1(b) and FIG. 1(c) show a front view and a rear view of the image processing apparatus, respectively. For example, the image processing apparatus shown in these figures correspond to a digital camera.

A digital camera main body 101 is shown in FIG. 1(b). An imaging section 102 provided in a control section of the image processing apparatus is mainly composed of a lens for taking an optical image, a charge coupled device (CCD) that photoelectically converts the optical image taken, an analog-to-digital (A/D) conversion section that converts the photoelectrically converted analog signal into a digital signal. An image processing section 103 performs a variety of imaging processes such as a filtering process, color conversion process, gamma correction process and the like on digital image signals outputted from the imaging section 102.

An image compression and decompression section 104 compresses and converts the digital image signal output from the image processing section 103 into image data in JPEG format. A user interface (UI) setting section 105 is a user interface that allows the user to operate the digital camera main body 101, and make settings relating to automatic print data (to be described below) with respect to the images photographed.

A data recording section 106 is connected to the image compression and decompression section 104 and an automatic print data generation section 107. The data recording section 106 stores image data and automatic print data that are transmitted through an interface (IF) section 108 in a removable memory card 109 that can be loaded and unloaded with respect to the IF section 108. The image recording section of the digital camera 101 in accordance with the embodiment of the present invention is described above.

Next, an image display/playback section is described.

As described above, the image data taken is subject to image processing at the image processing section 103, and inputted in a display control section 110 through the image compression and decompression section 104. Also, the image data stored in the memory card 109 is read out through the IF section 108 by a data read/analysis section 111, and only the image data that has been compressed in JPEG format by the image compression and decompression section 104 is decompressed and converted into bit map data, which is then inputted in the display control section 110. The display control section 110 displays an image on a display section 112 based on the inputted image data. A wireless communication section 113 is capable of transmission and reception of image data and automatic print data through wireless communication.

Next, a printer section for the image processing apparatus in accordance with the embodiment of the present invention is described.

Figure 2A:
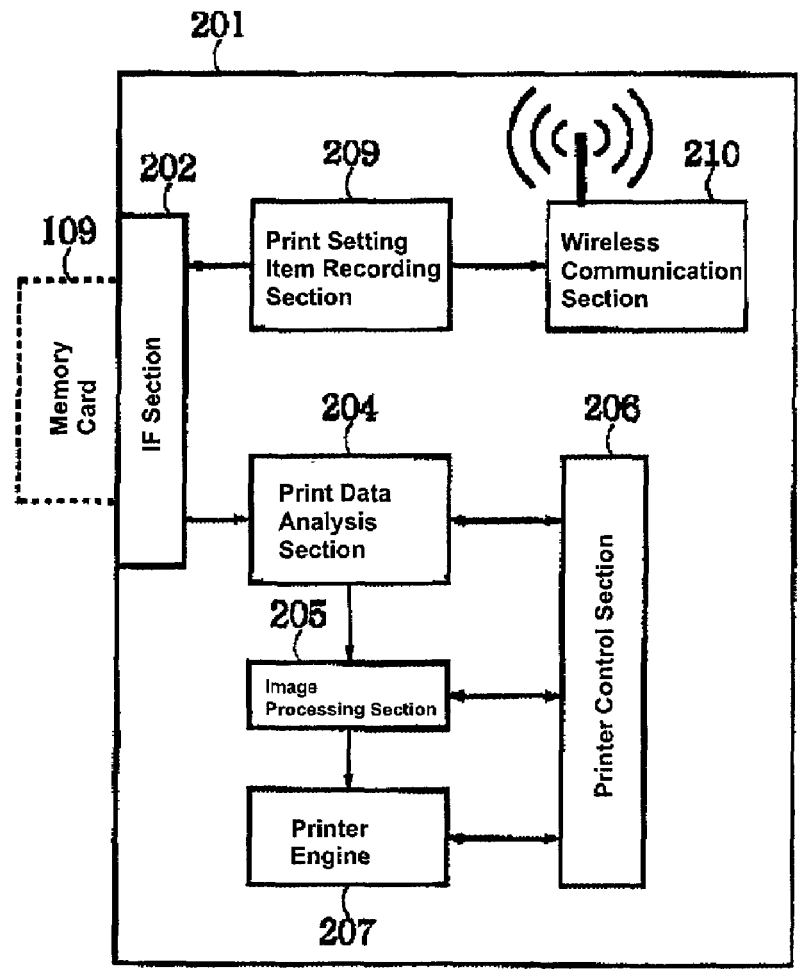
FIG. 2(*a*) and 2(*b*) describe an image processing apparatus in accordance with one embodiment of the present invention.
Figure 2B:
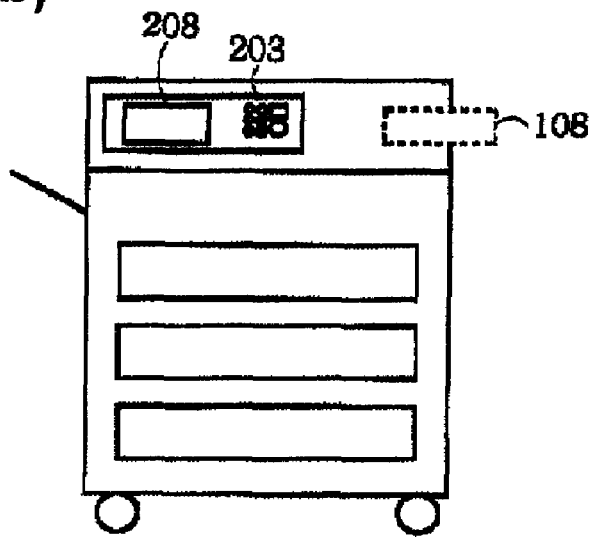

FIGS. 2(a) and 2(b) show an image processing apparatus in accordance with one embodiment of the present invention. More particularly, FIG. 2(a) shows a control block diagram of the image processing apparatus, and FIG. 2(b) shows a front view of the image processing apparatus. For example, an image processing system may be formed from the digital camera 101 shown in FIGS. 1(a)-1(c) and a printer 201.

Referring to FIG. 2, the printer 201 includes an interface (IF) section 202 that permits loading and unloading of a memory card 109 that is mountable on the digital camera 101. When the memory card 109 is connected to the IF section 202, and an "automatic print" key (not shown) on a print operation section 203 is depressed, a print data analysis section 204 analyzes various data that are inputted from the memory card 109 through the IF section 202, and image data is outputted to an image processing section 205 and automatic print data is outputted to a printer control section 206.

The image processing section 205 performs various image manipulations on the inputted image data including color conversion process (including at least one of a process of scaling the picture to increase or decrease its size, up-down flipping instruction, left-right flipping instruction, color inversion instruction, rotation instruction and other special effect processes). The printer control section 206 performs an overall control of the printer apparatus, and controls the image processing section 205 and a printer engine 207 based on the automatic print data inputted from the print data analysis section 204.

The printer engine 207 outputs prints based on the image data inputted from the image processing section 205. The user manipulates the operation section 203 to operate the printer apparatus. A display section 208 is included in the operation section 203 and displays the current status of the printer apparatus. When the memory card 109 is connected to the IF section 202, and in response to an operation of the operation section 203, a print setting item recording section 209 stores print setting items that can be set on the printer 201 in the memory card 109.

A wireless communication section 210 performs transmission and reception of image data and automatic print data through wireless communication.

Figure 3:
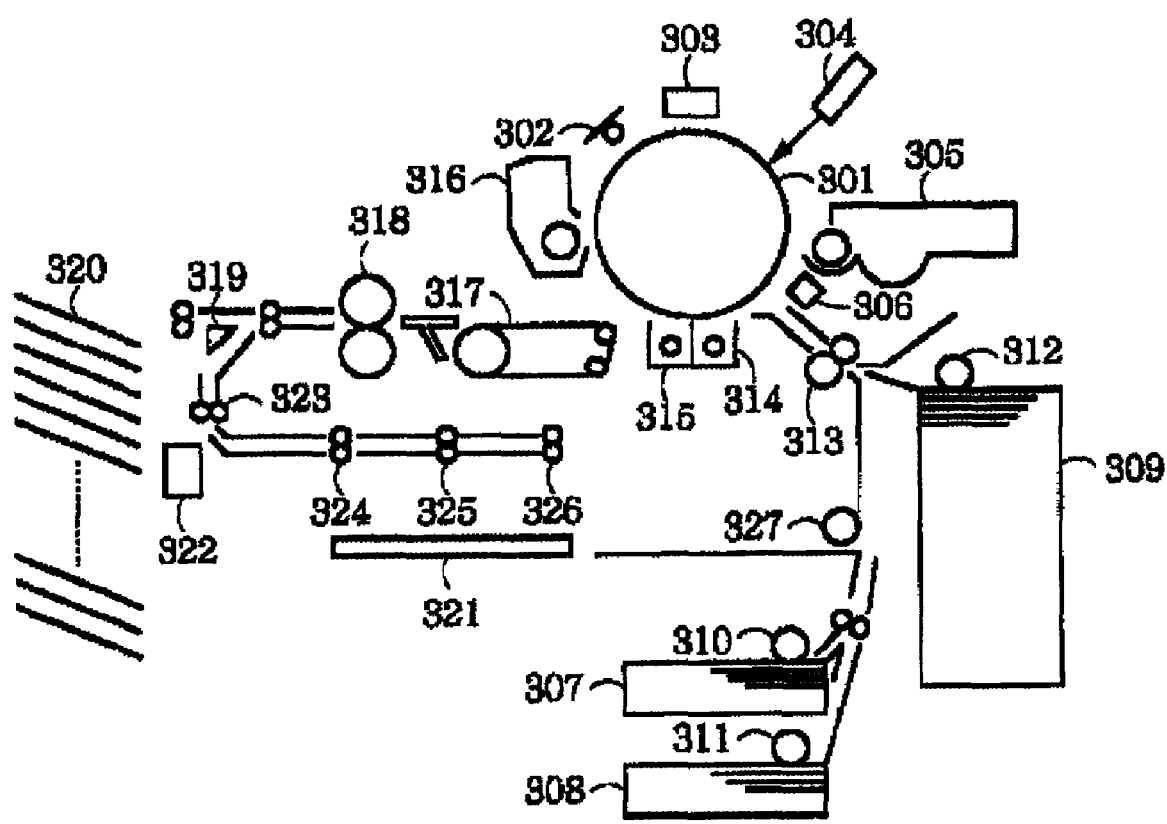
FIG. 3 schematically shows a structure of components of a printer engine shown in FIG. 2(*a*).

FIG. 3 schematically shows a structure of components of the printer engine shown in FIG. 2(a), which may correspond, for example, to a laser printer.

Referring to FIG. 3, a pre-exposure lamp 302 is provided adjacent to a photosensitive drum 301. The pre-exposure lamp 302 removes electric charges from the photosensitive drum 301 in preparation for image forming. A first charger 303 uniformly charges the photosensitive drum 301. An exposure device 304, which is formed from, for example, a semiconductor laser, exposes the photosensitive drum 301 to form an electrostatic latent image based on the image data process by the image processing section 205.

A developer 305 contains developing agent (toner) such as black toner. A pre-transfer charger 306 applies a high voltage to paper before the toner image developed on the photosensitive drum 301 is transferred onto the paper. Paper feed units 307, 308 and 309 have paper feed rollers 310, 311 and 312, respectively which feed transfer papers into the printer apparatus. By driving either of the paper feed rollers 310, 311 and 312, the transfer paper is fed into the printer apparatus, temporarily stops at a position where a resist roller 313 is disposed, and fed again in synchronism with a timing for writing the image formed on the photosensitive drum 301.

A transfer charger 314 transfers the toner image developed on the photosensitive drum 301 onto the transfer paper. A separation charger 315 separates the transfer paper on which the image transfer has been completed from the photosensitive drum 301. A cleaner 316 collects toner that has not been transferred and remains on the photosensitive drum 301. A transfer belt 317 transfers the transfer paper on which the image transfer process has been completed to a fixer 318, where the transferred image is fixed on the transfer paper by, for example, heat, and discharges the transfer paper onto a bin tray 320. A flapper 319 controllably switches the transfer path for transfer paper from an intermediate tray 321 to the bin tray 320 or vice versa. Transfer rollers 323, 324, 325 and 326 feed transfer paper to the intermediate tray 321. A paper re-feeding roller 327 transfers the transfer paper fed from the intermediate tray 321 to the position where the resist roller 313 is disposed. A paper discharge sensor 322 detects the presence or absence of transfer paper that is to be discharged. The printing system of the present invention is not limited to the embodiment described above, and may be a different printing system. For example, other printing systems in which the present invention is applicable include, but are not limited to, a full-color printer in which color images that are transferred onto intermediate transfer members are transferred together onto a transfer paper, and a quad-tandem type full-color printer.

Figure 4:
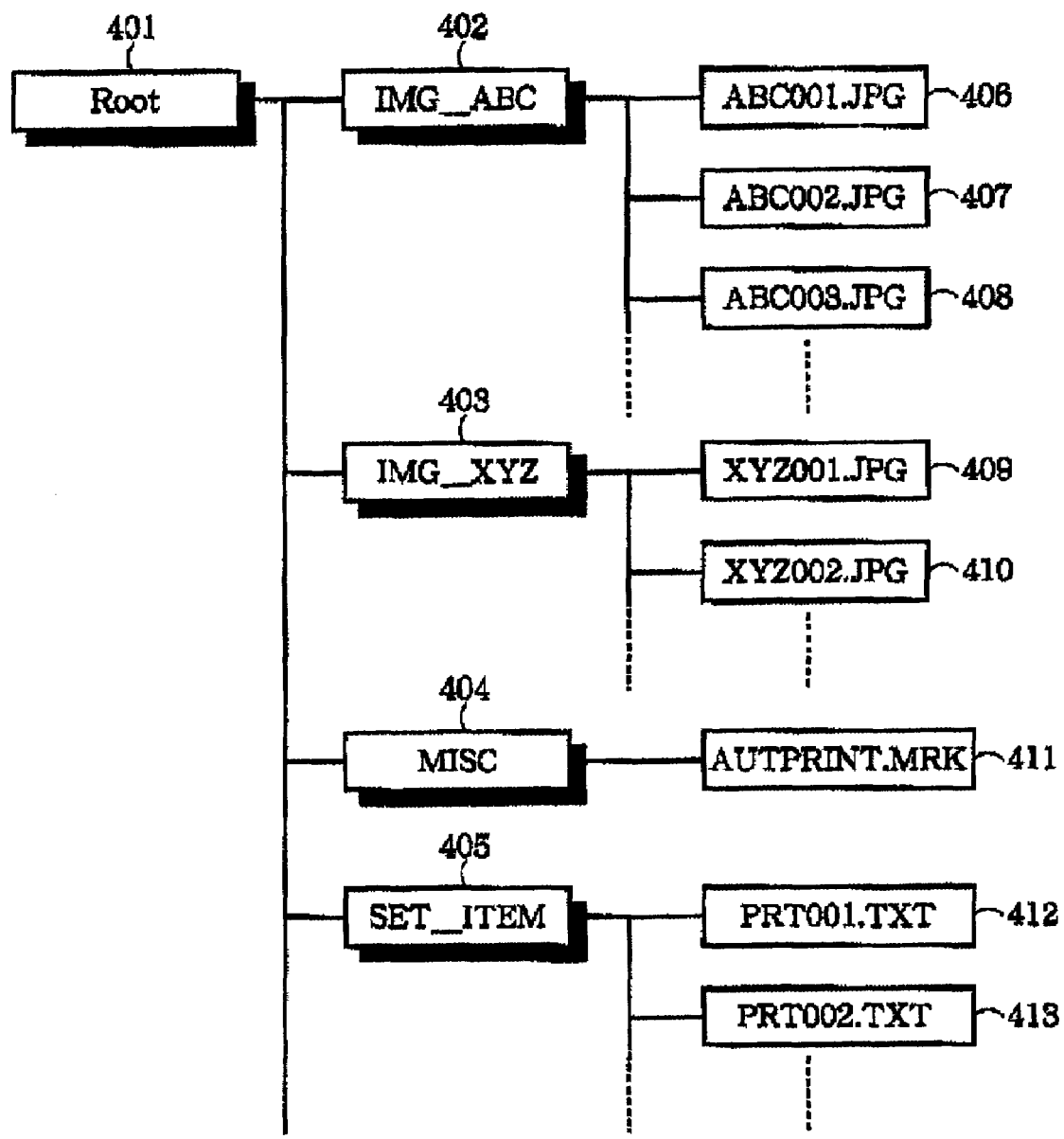
FIG. 4 describes a directory structure within a memory card for an image processing apparatus in accordance with one embodiment of the present invention.

FIG. 4 describes a directory structure within the memory card 109 for an image processing apparatus in accordance with one embodiment of the present invention.

FIG. 4 shows directories 401-405. The directories 402 and 403 store image data. The directory 404 stores automatic print data. The directory 405 stores setting items that can be set as automatic print data for the printer.

Files 406-410 store image data in JPEG format as described above. A file 411 stores automatic print data, such as, for example, text data.

Files 412 and 413 store settable items for each printer, such as, for example, text data. The files 412 and 413 store setting items for independent printers.

As shown in the figure, in accordance with the present embodiment, the image data, the automatic print data and the automatic print settable items in the memory card 109 are stored in independent directories, respectively.

Next, a download process operation for the automatic print setting items of the printer in the image processing apparatus in accordance with the present invention is described with reference to FIGS. 5 and 6.

Figure 5:
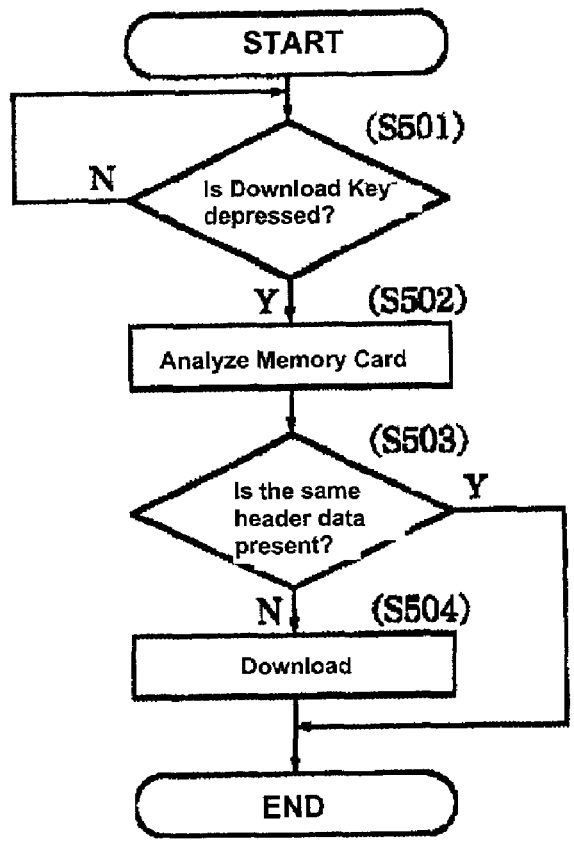
FIG. 5 shows a flowchart of one example of a first data processing procedure for an image processing apparatus in accordance with one embodiment of the present invention.

FIG. 5 shows a flowchart of one example of a first data processing procedure for an image processing apparatus in accordance with one embodiment of the present invention, which may correspond, for example, to a procedure of downloading the automatic print setting items of the printer. Steps S501-S504 shown in FIG. 5 are described in detail below.

Figure 6:
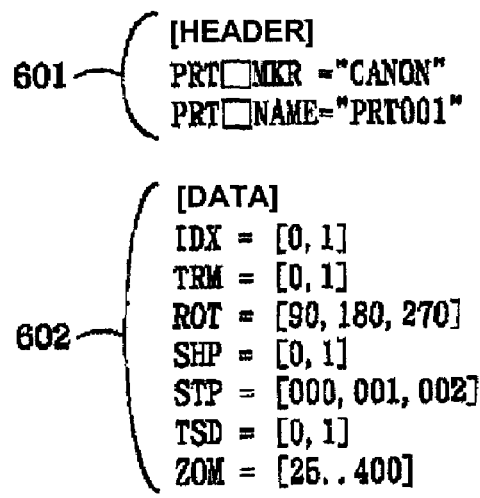
FIG. 6 shows one example of automatic print setting items for an image processing apparatus in accordance with one embodiment of the present invention.

FIG. 6 shows one example of automatic print setting items for an image processing apparatus in accordance with one embodiment of the present invention.

As shown in FIG. 6, the automatic print setting items are formed from a header section 601 and a data section 602.

The header section 601 includes data that specifies the printer, such as data for the printer manufacturer (PRT☐MKR) and the type of the printer (PRT☐NAME). The data section 602 includes data for settable items such as data for index printing (IDX), trimming (TRM), rotation (ROT), sharpness (SHP), stapling (STP), two-side printing (TSD) and zooming (ZOM). The setting items with the description of [0, 1] mean that each of them with the indication of [0, 1] can be either set (0) or not set (1).

The description of [90, 180, 270] at the rotation (ROT) means angles that can be set by rotation. The description of [000, 001, 002] at the staple (STP) means the number and locations of the staples. In this case, the position of each of the staples and the number of the staples may be allocated in advance to each of the numbers "000" and "001". A variety of settings regarding the manners of stapling can be described with more direct expressions using a wider variety of words. For example, the positions and the number of staples can be expressed as "Upper left at one location" or the like. The description of [25, . . . 400] at the zooming (ZOM) indicates the range of zooming that can be set.

First, when the memory card 109 is connected to the IF section 202 of the printer main body, and a "download" key (not shown) on the operation section of the printer main body is depressed (S501), the print data analysis section 204 analyzes the data in the memory card 109 (S502).

A determination is made from the analysis result in step S502 as to whether header data the same as the header data of the printer is present in the memory card 109 (S503). When it is determined that the same header data is present, the process is completed without additional steps. When it is determined that the same header data is not present, the automatic print setting items are downloaded (S504) onto the memory card 109, and the process is completed.

By using the memory card 109 that stores the downloaded data for the digital camera, appropriate setting items that match the functions of the printer can be displayed when the DPOF is set.

For example, only the functions that can be handled by the printer may be displayed on the digital camera. Alternatively, functions that cannot be handled by the printer may be displayed "gray out" so that they cannot be selected. Also, when the user attempts to set a function that cannot be handled by the printer, a warning indication may be displayed.

Next, a file structure of the automatic print data of the digital camera in accordance with one embodiment of the present invention is described below with reference to FIG. 7.

Figure 7:
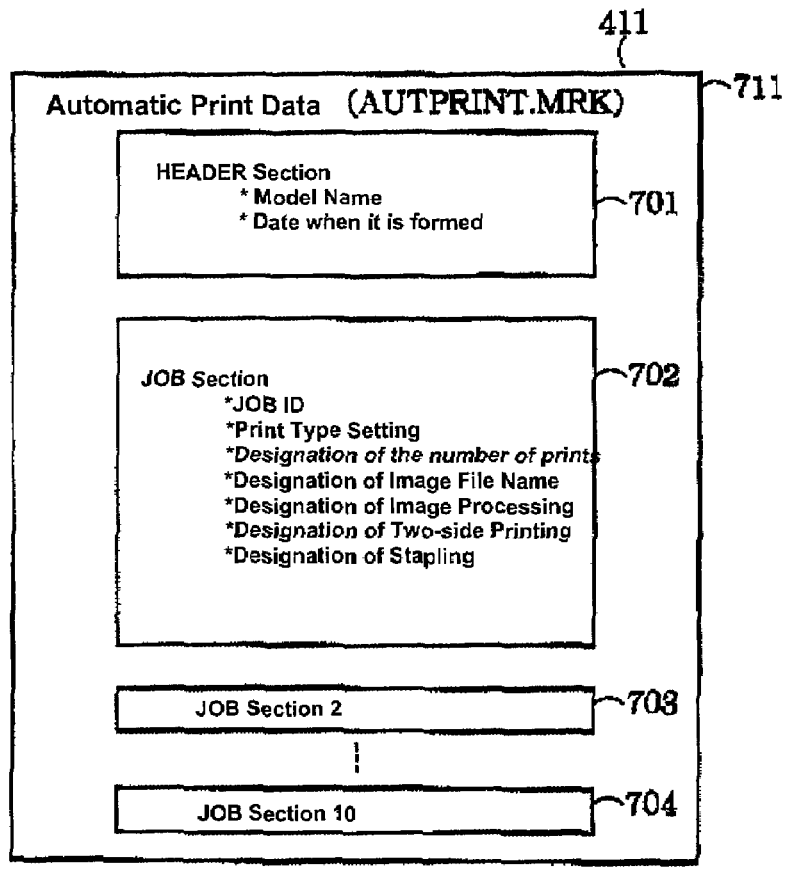
FIG. 7 describes a file structure of automatic print data for an image processing apparatus in accordance with one embodiment of the present invention.

FIG. 7 describes a file structure of automatic print data for an image processing apparatus in accordance with one embodiment of the present invention.

In FIG. 7, automatic print data (AUTPRINT, MRK) 411 has a file structure that is divided into a header section 701 and job sections 702-704. The header section 701 stores data of the model name of the digital camera that generates the automatic print data (AUTPRINT, MRK) and the date and time when the automatic print data (AUTPRINT, MRK) is generated.

Each of the job sections 702-704 stores an identification (ID) number of the job, setting of printing type (for example, standard printing, index printing and the like), image file name (for example, ABC001. JPG, XYZ001. JPG) designation, image process (for example, trimming data, rotation data, date and time print, title print and the like) designation, twoside print designation, stapling designation.

For example, the data for the two-side print designation may designate as to whether image data is to be printed on both sides of a printing paper when the image data is printed out. The data for stapling designation may designate as to whether a staple process is to be conducted when the image data is printed out. The content of the data for stapling designation may designate as to whether or not a stapling operation is conducted, and the location of the staples (for example, a staple at a corner or double staples).

Next, the generation of automatic print data in accordance with the embodiment of the present invention is described below with reference to FIG. 8. It is noted that the automatic print data may include a so-called DPOF file.

Figure 8:
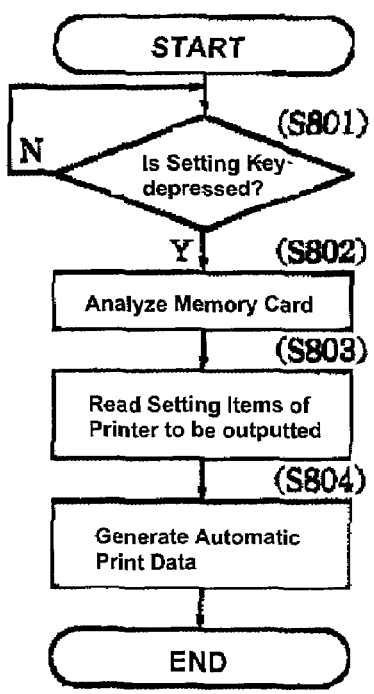
FIG. 8 shows a flowchart of one example of a second data processing procedure for an image processing apparatus in accordance with one embodiment of the present invention.

FIG. 8 shows a flowchart of one example of a second data processing procedure for an image processing apparatus in accordance with one embodiment of the present invention, which may correspond to the procedure for setting the automatic print data of the digital camera 101 shown in FIG. 1. Steps S801-S804 of the second data processing procedure are described below.

As described above, when the memory card 109 in which the data for the automatic print setting items is downloaded is connected to the IF section 108 of the digital camera, and a "setting" key (not shown) on the operation section of the digital camera (S801) is depressed, the data read/analysis section 111 analyzes the data in the memory card 109 (S802).

Next, when a desired output printer (for example, PRT001 in the case of the present embodiment) is selected (S803), the digital camera 101 is enabled to generate automatic print data based on the file 412 based on the data for automatic print setting items (S804), and the process is completed.

Next, a print output operation according to the automatic print data of the present embodiment is described with reference to FIGS. 9 and 10.

FIG. 9 describes automatic print data for an image processing apparatus in accordance with one embodiment of the present invention.

In FIG. 9, the automatic print data includes a header section 901 and job sections 902 and 903, which are similar to those described above with reference to FIG. 7. In the job section 902, the following designations are made. The identification of the job is 001 (PRT□PID=001), the printing type is a standard printing (PRT□TYP=STD), the number of prints is 3 prints (PRT□QTY=003), a two-side printing operation is designated (PRT□TSD=001) (when the description is "000", the two-side printing operation is not designated), and a stapling operation is designated to be double stapling at two locations along the left edge (PRT□STP=002) (the description "000" indicates no stapling, and the description "001" indicates a corner stapling at the upper left corner in one location).

Images to be printed are ABC001.JPG, ABC002.JPG, ABC003.JPG, ABC004.JPG, XYZ001.JPG, XYZ002.JPG, XYZ003.JPG, and XYZ004.JPG.

With respect to the image ABC001.JPG, additional image manipulations are designated. For example, trimming (CFG□TRM=200, 100, 600, 1000, which means that pixels at pixel number X600, Y1000 are trimmed with the pixel number X200, Y100 as being a reference point), rotation (CFG□ROT=90, which means a rotation in clockwise by 90 degrees), and zooming (CFG□ZOM=120, which means 120% zooming) are designated. Also, a date printing operation and an image manipulation on sharpness are designated for the image ABC002.JPG, a trimming operation and a date printing operation are designated for the image ABC003.JPG, and a date printing operation and an image rotation process are designated for the image ABC004.JPG.

Figure 10:
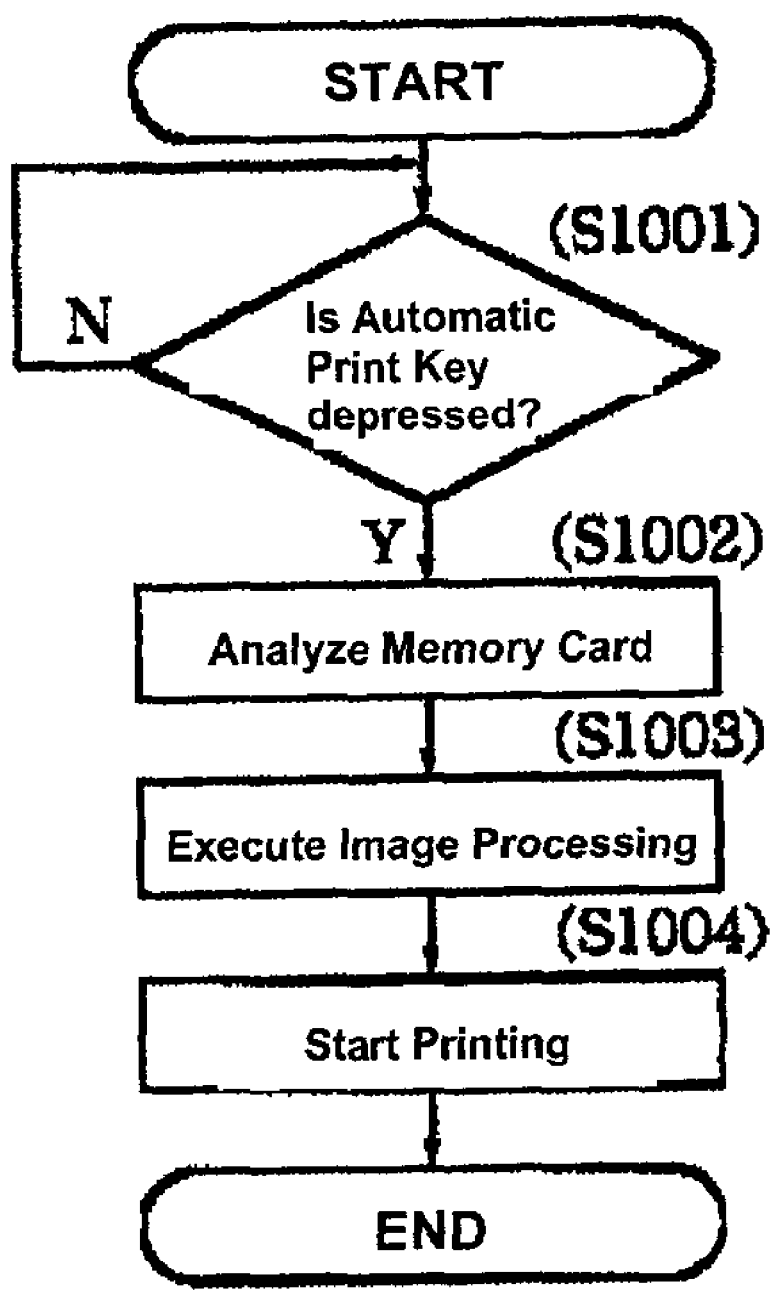
FIG. 10 shows a flowchart of one example of a third data processing procedure for an image processing apparatus in accordance with one embodiment of the present invention.

FIG. 10 shows a flowchart of one example of a third data processing procedure for an image processing apparatus in accordance with one embodiment of the present invention, which may correspond to a procedure of automatic printing operation performed by the printer 201 shown in FIG. 2. Steps S1001-S1004 of the third data processing procedure are described below.

First, when the memory card 109 is connected to the IF section 202 of the printer 201, and an "automatic print" key (not shown) on the operation section is depressed (S1001), the print data analysis section 204 analyzes the data in the memory card 109 (S1002). As described above, the automatic print data (in this example, AUTPRINT.MRK) is outputted to the printer control section 206. Then the image processing section 205 performs image processings, for example, image processing for date printing and rotation (S1003). Then the data processed by the image processing section 205 is outputted to the printer engine 207, the printer engine 207 starts printing (S1004), and the process is completed.

When the automatic print data shown in FIG. 9, for example, is stored in the memory card 109, since a two-side printing operation is designated, the printer control section 205 controls the printer engine 207 to execute the twoside printing operation.

Also, the staple operation is designated in the automatic print data shown in FIG. 9, the printer control section 206 controls the printer engine 207 to execute the staple operation and outputs prints.

In the present embodiment, a black and white printer is used as an example of the printer. However, a color printer can also be used. In such case, an image processing for color tone may be included.

In the embodiment described above, when an image photographed by a digital camera is printed out by a printer, print setting items can be downloaded from the printer that is to print the image before automatic print data is generated, which improves the operability of the digital camera and the printer for the user.

In the embodiment described above, the data for automatic print setting items is downloaded when the memory card 109 is connected to the printer 201. Next, an operation of downloading the data for automatic print setting items, which uses wireless communication, is described with reference to a flowchart shown in FIG. 11.

Figure 11:
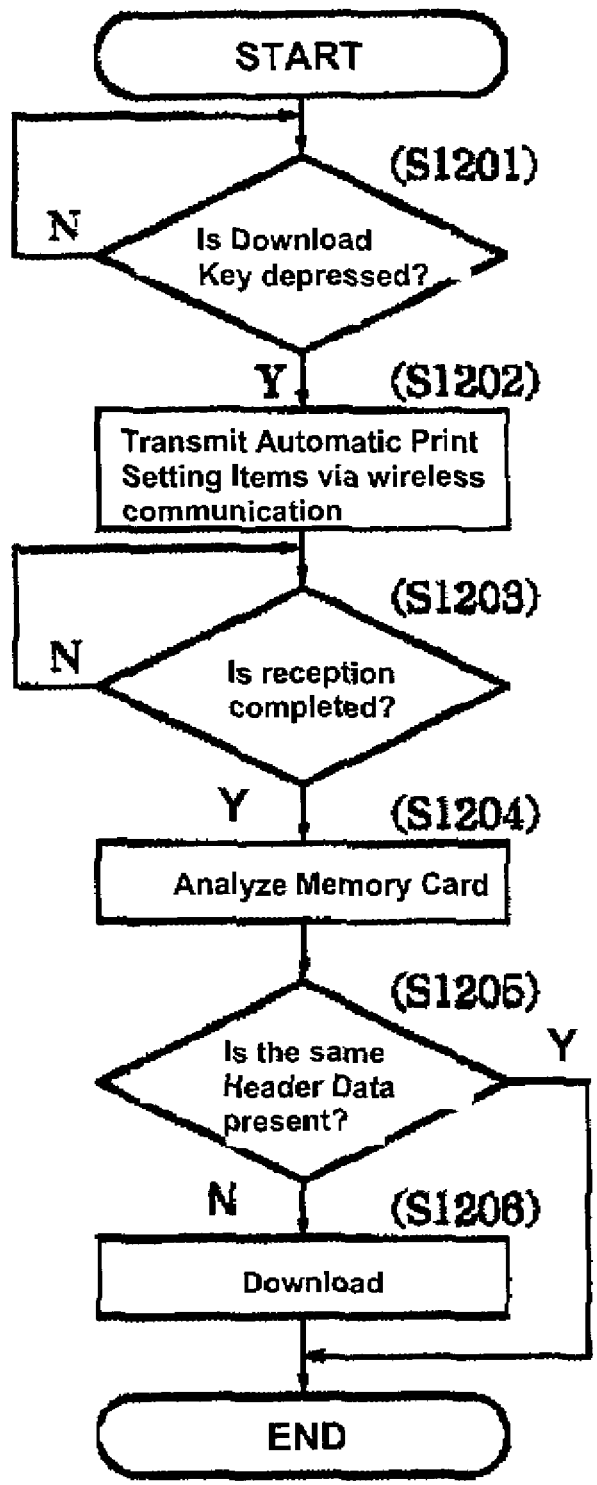
FIG. 11 shows a flowchart of one example of a fourth data processing procedure for an image processing apparatus in accordance with one embodiment of the present invention.

FIG. 11 shows a flowchart of one example of a fourth data processing procedure for an image processing apparatus in accordance with one embodiment of the present invention, which may correspond, for example, to an operation of downloading the data for automatic print setting items of the printer. Steps 1201-S1204 of the fourth data processing procedure are described below.

First, when the memory card 109 is connected to the IF section 108 of the digital camera main body, and a "download" key (not shown) on the operation section on the printer 201 is depressed (S1201), the wireless communication section 113 in the printer transmits the data for automatic print setting items (S1202). The wireless communication section 113 in the digital camera 101 receives the data for automatic print setting items transmitted (S1203), and the data in the memory card 109 (S1204) is analyzed in connection with the data received from the printer.

A determination is made from the analysis result in step S1204 as to whether header data the same as that of the printer is present in the memory card 109 (S1205). When it is determined that the same header data is present, the process is completed without additional steps. When it is determined that the same header data is not present, the automatic print setting items are downloaded (S1206) onto the memory card 109, and the process is completed. Succeeding steps for generating automatic print data and printing operation are similarly conducted in the embodiment described above.

Also, the wireless communication section can utilize a public communication network such as the personal handy phone system (PHS), or other wireless communication system such as an infrared communication system.

Further, as shown in FIG. 6, data that specifies printers as image processing apparatuses may be stored in a storage medium of the digital camera or a memory card such that a plurality of printers can be used for different printing results. In other words, settable items can be readily changed according to the printers to be used.

Furthermore, when images and print data in DPOF are transmitted or received by using the wireless communication technology, and a plurality of printers may be located close by, data that specifies one of the printers which is to be communicated with may be specified by the digital camera. This is convenient to the user.

The operation of transmitting print setting items based on the functions of the printer to a digital camera by wireless communication is easier than the operation of transferring print setting items by means of a memory card. Furthermore, the use of wireless communication eliminates physical operations such as cable connection and the like.

Referring to a memory map shown in FIG. 12, a structure of data processing programs that are readable by an image processing system to which an image processing apparatus in accordance with one embodiment of the present invention is applicable is described below.

FIG. 12 is an illustration to describe a memory map of a storage medium that stores a variety of data processing programs that are readable by an image processing system to which an image processing apparatus in accordance with one embodiment of the present invention is applied.

Although not shown in the figure, data for managing the group of programs stored in the storage medium, for example version data, data for the author and the like may also be stored in the same storage medium. Further, data that is dependent on the operating system on the program reading side, for example, icons to identify and display representative images of the programs may also be stored in the same storage medium.

Furthermore, data that belong to the variety of programs are also managed and stored in the storage medium. In some occasions, a program for installing the variety of programs on the computer, a decompression program to be used when programs to be installed are compressed, and the like may be stored in the storage medium.

The functions shown in FIGS. 5, 8, 10 and 11 in accordance with the embodiment of the present invention may be executed by a host computer, using programs that are installed from the outside. In this case, the present invention is also applicable to the cases in which data including programs are supplied to an output device from a storage medium such as a CD-ROM, a flash memory and a floppy disk or from an external storage medium through a network.

Also, a storage medium that stores program codes of the software that realize the functions of the present embodiment described above may be supplied to the system or the apparatus, and a computer (or a central processing unit (CPU) or a microprocessor unit (MPU)) in the system or the apparatus may read the program codes stored in the storage medium and execute the program codes.

The program codes read from the storage medium help realize the novel functions of the present invention. The storage medium which stores the program codes is an important feature. Storage media that store program codes and removable storage media that can be freely loaded on and unloaded from image processing apparatuses include, for example, floppy disks, hard disks, optical disks, optical magnetic disks, CD-ROMs, CD-Rs, magnetic tape, non-volatile memory cards, ROMs, EEPROMs and the like.

Moreover, the operating system (OS) that is running on the computer may execute a part or all of the processes based on instructions of the program codes, such that the functions of the present embodiment described above are realized by the operation of the computer. Such operation and system are also within the subject matter of the present invention.

Furthermore, program codes that are read from the storage medium may be written in a storage device such as a buffer, a memory or the like provided on a functional expansion board inserted in the computer or a functional expansion unit connected to the computer, and then based on instructions of the program codes, a CPU or the like provided on the functional expansion board or the functional expansion unit may execute a part or all of the processes, such that the functions of the present embodiment described above are realized. Such operation and system are also within the subject matter of the present invention.

It is noted that the digital camera described above may also be capable of photographing moving pictures.

The present invention is also applicable to a structure in which print images are generated from the moving pictures according to automatic print data.

Print setting items other than those described above may also be applicable to the present invention.

The type of printer is not limited to an electronic photographic type printer. For example, the present invention may also be applicable to ink jet type printers or sublimation type printers.

Also, print setting items may be transmitted and received not only by a memory card but also by wireless communication or wire communication.

Furthermore, the printer may be a printer on a network such as an intranet, and data for print setting items may be transmitted and received via the network. Also, the network may be in a wired system or a wireless system.

Also, not only the settable items themselves are transmitted and received, but printer model data may also be transmitted and received. In this case, data representative of settable items for multiple printers may be stored at the equipment at which print setting items are set. In response to recognition of the printer type data, print setting items can be changed or switched to match the printer identified by the printer type data.

Also, the unit that analyzes the print setting items and the unit that generates additional data relating to the print setting may be composed of a specialized LSI, or software that functions by the control of the CPU.

Furthermore, in the above embodiment, the present invention is described with reference to the automatic print data. However, the present invention is also applicable to an automatic playback system, apparatus and method.

For example, data for the playback capability of a playback apparatus may be stored in a storage medium, and the data for the playback capability may be transmitted to an apparatus that generates automatic playback data.

The apparatus that generates the automatic playback data analyzes and displays a setting menu based on the data for the playback capability, makes settings based on the display, and stores image data and the automatic playback data in a storage medium.

The playback data may be used for display (for example, slide show), or for transmission (for example facsimile transmission or e-mail transmission).

Also, the automatic playback system may be constructed such that the data for the playback capability of the playback apparatus is transmitted by wireless communication in a manner similar to the embodiment described above.

As described above, the present invention reduces the user's burden of manipulating print setting items for each printer, and reliably avoids an incident in which print setting items that cannot be set by a printer that is to output image data are set.

Also, the present invention is effective in avoiding interruptions of printing operations caused by wrong print setting items and creates an image processing atmosphere with a high level of operability and convenience that can efficiently perform the process of printing image data according to the automatic print data.

The foregoing description of the embodiments has been given for illustrative purposes only and should not be construed as imposing any limitation in any respect.

The scope of the invention is, therefore, to be determined solely by the following claims and not limited by the text of the specification and alterations made within a scope equivalent to the scope of the claims fall within the true sprit and scope of the invention.

What is claimed is:

1. An image processing apparatus capable of detachably mounting thereon a recording medium on which image data are recorded so that an external printer can read out the recorded image data, said image processing apparatus comprising:
   read-out control means for reading-out a print setting item information file in which print setting item information indicating an item settable by the external printer is described, from said recording medium on which the print setting item information of each of a plurality of external printers is recorded by the external printer;
   generating means for generating print setting information for printing, by the external printer, the image data recorded on said recording medium;
   analyzing means for reading-out and analyzing the print setting item information file, when said image processing apparatus sets up a print setting in advance; and
   selecting means for selecting a printer from among the plurality of external printers,
   wherein the print setting information includes information for specifying the external printer, and
   wherein said generating means generates the print setting information on the basis of the print setting item information corresponding to the printer selected by said selection means.

2. An image processing apparatus according to claim 1, wherein said generating means generates an automatic print information file describing print image designation information and the print setting information, in order to cause the external printer to automatically print the image data.

3. An image processing apparatus according to claim 2, wherein said recording medium includes a directory for managing the automatic print information file.

4. An image processing apparatus according to claim 1, wherein said recording medium includes a directory for managing the print setting information file independently of the image data.

5. An image processing apparatus according to claim 2, wherein the automatic print information file is a DPOF file.

6. An image processing apparatus according to claim 1, wherein the print setting information file includes at least one of print type setting information, image processing setting information, two-side print setting information and staple setting information.

7. An image processing apparatus according to claim 1, wherein the print setting item information is recorded on said recording medium as the print setting information file on each external printer basis.

8. An image processing apparatus according to claim 1, wherein the information for specifying the external printer is type information thereof and is described in a header portion of the print setting information file.

9. A control method for an image processing apparatus capable of detachably mounting thereon a recording medium on which image data are recorded so that an external printer can read out the recorded image data, said control method comprising:
   a read-out control step of reading-out a print setting item information file in which print setting item information indicating an item settable by the external printer is described, from said recording medium, on which the print setting item information of each of a plurality of external printers is recorded by the external printer;
   a generating step of generating print setting information for printing, by the external printer, the image data recorded on said recording medium;
   an analyzing step of reading-out and analyzing the print setting item information file, when said image processing apparatus sets up a print setting in advance;
   a selecting step of selecting a printer from among the plurality of external printers, wherein the print setting information includes information for specifying the external printer, and
   wherein said generating step generates the print setting information on the basis of the print setting item information corresponding to the printer selected in said selecting step.

10. A control method according to claim 9, wherein said generating step includes a step of generating an automatic print information file describing print image designation information and the print setting information, in order to cause the external printer to automatically print the image data.

11. A control method according to claim 10, wherein said recording medium includes a directory for managing the automatic print information file.

12. A control method according to claim 9, wherein said recording medium includes a directory for managing the print setting information file independently of the image data.

13. A control method according to claim 10, wherein the automatic print information file is a DPOF file.

14. A control method according to claim 9, wherein the print setting information file includes at least one of print type setting information, image processing setting information, two-side print setting information and staple setting information.

* * * * *